United States Patent

Bush et al.

[15] 3,650,773

[45] Mar. 21, 1972

[54] WEIGHING AND LABELING SYSTEM

[72] Inventors: Robert G. Bush; Gilbert H. Hannon, both of Green Bay, Wis.

[73] Assignee: L. D. Schreiber Cheese Co., Inc.

[22] Filed: Feb. 9, 1970

[21] Appl. No.: 9,578

[52] U.S. Cl. ..................................99/171 R, 53/14, 53/28, 53/59 W, 177/4, 177/DIG. 3, 235/61 PS
[51] Int. Cl. ........................................................B65b 11/12
[58] Field of Search............99/171 R, 178; 53/14, 28, 59 W, 53/59; 177/3–5, 52, DIG. 1, DIG. 3; 235/58 PS, 61 PS; 156/362, 363, 566, 360

[56] References Cited

UNITED STATES PATENTS

| | | | |
|---|---|---|---|
| 3,540,971 | 11/1970 | Johanski, Jr. | 177/3 X |
| 2,259,866 | 10/1941 | Stokes | 53/14 |
| 3,244,278 | 4/1966 | Weprin et al. | 99/171 R UX |
| 2,887,837 | 5/1959 | Toby | 53/59 W UX |
| 3,289,386 | 12/1966 | Farmer | 99/171 R UX |
| 3,276,526 | 10/1966 | Loshbough | 177/3 |
| 3,384,524 | 5/1968 | Hansen, Jr. | 156/360 |
| 3,342,661 | 9/1967 | Arvidson et al. | 156/363 X |
| 3,194,710 | 7/1965 | Stremke et al. | 156/362 X |
| 3,162,258 | 12/1964 | Schmidt | 177/52 X |

Primary Examiner—Frank W. Lutter
Assistant Examiner—Steven L. Weinstein
Attorney—Dressler, Goldsmith, Clement & Gordon

[57] ABSTRACT

A method and apparatus for automatically weighing and labeling random weight articles as they are being packaged. The articles are moved along a path to a wrapping station by conveying means and a weighing station is located along the path. The weighing station has a weighing mechanism which produces an output that is fed to a computer or other type of device for determining the total price of the article based upon a price per unit of weight. The total price, as well as the price per unit of weight, and the total weight are supplied to a printing mechanism that is disposed adjacent the path of movement of the advancing packages and automatically prints this information on labels that are applied to a continuous supply of film. The printing could also include product identification information, if desired. Furthermore, the printing could be done directly on the film. The feeding of the film and the articles is synchronized so that the portion of the continuous film having the printed information thereon moves into package forming relationship with the article corresponding to the information, whereupon, the article is then completely enclosed by the film to produce a finished package.

9 Claims, 1 Drawing Figure

Patented March 21, 1972
3,650,773
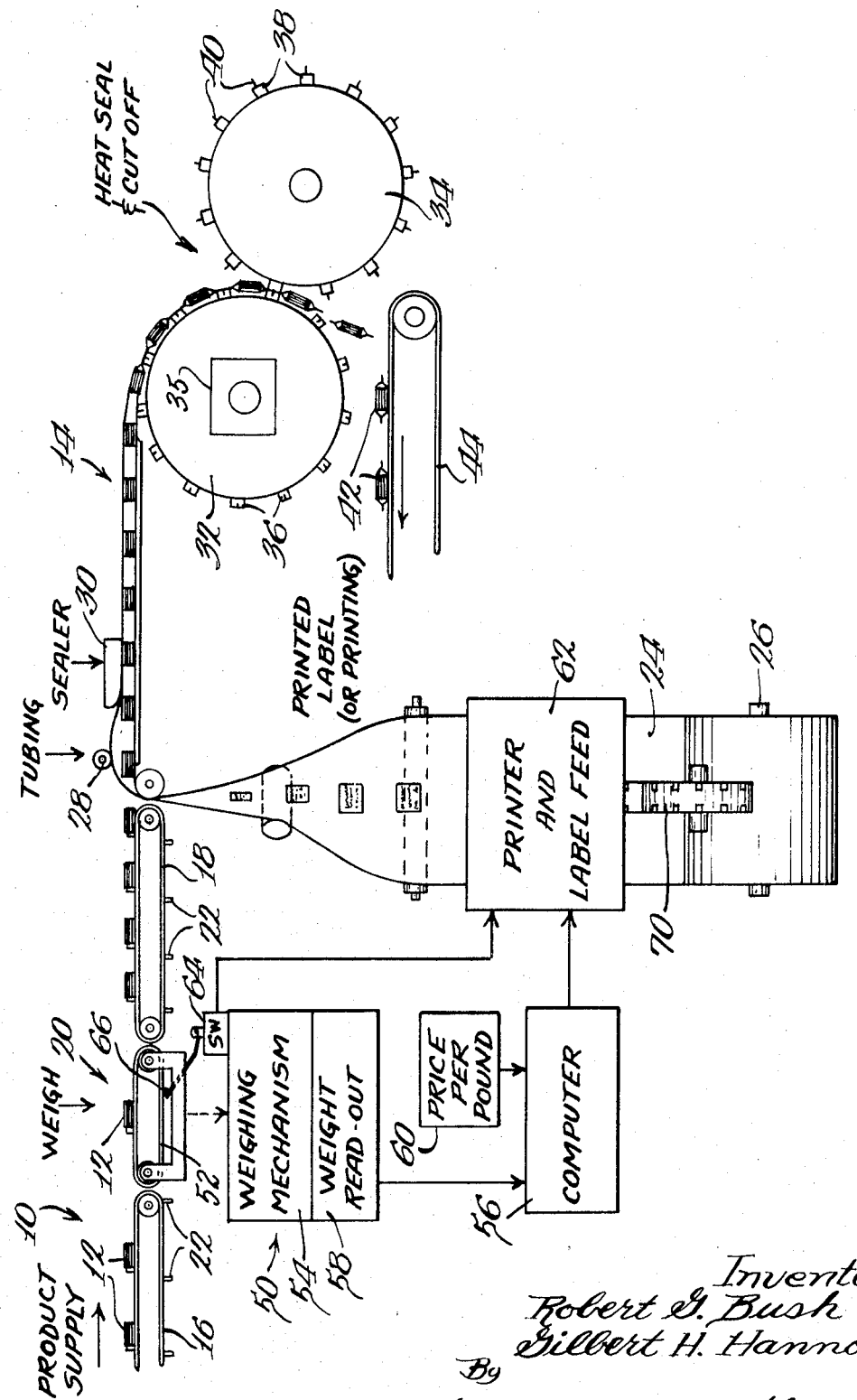
Inventors:
Robert G. Bush
Gilbert H. Hannon
By
Dressler, Goldsmith, Clement & Gordon
Attys

WEIGHING AND LABELING SYSTEM

BACKGROUND OF THE INVENTION

This invention relates to method and apparatus for automatically packaging food products and the like, and more particularly to an improved method and apparatus for automatically weighing and labeling food products and the like as they are being packaged.

In recent years, it has become common to automatically package various types of articles, such as food products and the like, on automatic machinery which produces flexible containers that provide light, compact, economical and attractive packages for individual articles. One machine which has been commercially available for many years for the packaging of food products produces packages for articles from a continuous web of stock material and transforms the web into a tubular member surrounding the articles moving along a predetermined path. The tubular stock material is then sealed along the overlapping edge and subsequently is sealed between adjacent articles and cut transversely between the articles to produce individually packaged articles. Such machines are generally disclosed in the technical reference manual "Flexible Packaging in Maraflex" copyright 1961 by Marathon, a division of American Can Company. The present invention has utility with the above mentioned type of equipment, as well as with various other different types of equipment for packaging random weight articles.

Many articles which are packaged as described above are of the type that are sold for a total price based upon a price per unit of weight and the total weight of the article within the package. Examples of articles packaged by the above methods and sold on this basis are cheeses, meats and various other food products. Thus, it has become customary in the industry to utilize additional automatic weighing and labeling mechanisms for the packaged articles after the articles have been completely packaged so that the final product would have the appropriate identification thereon including the total price of the article, the total weight, the price per unit of weight, as well as some type of commodity identification. One such type of weighing and labeling machine is disclosed in Hanson U.S. Pat. No. 3,384,524.

However, it will be appreciated that the above arrangement requires two completely separate operations for packaging and subsequently weighing and labeling the packaged articles. Such an arrangement is not only time consuming but requires considerable expenditure in the form of various machinery as well as suitable conveying means for positioning of the labels and for performing the automatic functions. Such machinery and conveying means necessarily requires a considerable amount of space for the appropriate relationship between the various machines producing the various individual functions and additional personnel for operating the various machines.

Furthermore, in weighing and labeling packaged articles, it becomes necessary to compensate for the weight of the container or package, particularly when low density articles are packaged which require a relatively large amount of packaging material for a given weight, or when large articles are packaged which require packages of substantial size and weight. An additional problem of the prior art method of packaging and labeling is that difficulty is encountered in obtaining proper adherence between a label and the container with certain types of product being present in the container at the time the label is applied. For example, some difficulty is encountered in applying a label to a package containing a product having an uneven surface, such as Swiss cheese.

BRIEF SUMMARY OF THE INVENTION

The present invention contemplates a method and apparatus for automatically weighing and labeling random weight articles as they are being packaged. In the illustrated embodiment, the packaging apparatus is disclosed in connection with a commercially available machine of the above mentioned type which utilizes a flexible continuous web of transparent, flexible package forming material which is formed in a tube with its longitudinal edges in overlapping relationship. The longitudinal edges are then heat sealed and the article is physically disposed within the tube and the tube is sealed transversely at spaced points between the articles and subsequently severed along these transverse seals to produce individually packaged articles.

In this type of operation, the articles are moved along one path and the packaging film is moved along a second path, with the two paths intersecting and the packaging and sealing operation being performed beyond the intersection of these two paths.

According to the present invention a weighing station is provided along the path of the moving articles which incorporates weighing mechanism that automatically weighs the articles as they are moving along a path and produces an output corresponding to the total weight of the article. This output is fed into a computer means which also has a price per unit weight information supplied thereto, and the computer produces an output in the form of a total price for the article based upon the selected unit price. The total price information, as well as the price per unit of weight and total weight, are fed to a printing mechanism which is disposed adjacent the path of the moving film, and an impression is formed on a label that is physically attached to the film or directly impressed upon the package material. The extreme advantage of the particular method and apparatus is that substantially all of the machinery required is of the commercially available type which can readily be purchased as standard components and would require only minor modifications, if any.

Thus, the present invention contemplates a method of automatically packaging, weighing and labeling articles by moving the articles along a first path, weighing the articles while they are in the first path, computing a total price for the article based upon a price per unit of weight, transferring the total price, the weight, and the price per unit of weight to a printing mechanism which is disposed adjacent the path of movement of continuously advancing packaging film, printing the information for each article on labels that are attached to the film and subsequently packaging individual articles with the portion of the continuous film having the information corresponding thereto.

BRIEF DESCRIPTION OF THE SINGLE VIEW OF THE DRAWING

The single view of the drawing schematically illustrates a packaging machine having the present invention incorporated therein.

DETAILED DESCRIPTION

While this invention is susceptible of embodiment in many different forms, there is shown in the drawing and will herein be described in detail only a preferred embodiment of the invention, with the understanding that the present disclosure is to be considered as an exemplification of the principles of the invention and is not intended to limit the invention to the embodiment illustrated.

As shown in the drawing, the present invention is illustrated in connection with a packaging machine including conveying means 10 for continuously moving random weight articles 12 from a loading station (not shown) along a predetermined path to a packaging station 14. The conveying means is in the form of chain conveyors 16 and 18 which are disposed end-to-end, and according to the present invention, a weighing station 20 is located between adjacent ends. Each of the conveyors 16 and 18 has a plurality of lugs 22 mounted in spaced relationship to each other with the lugs moving the articles 12 along a rectilinear path.

The packaging machinery further includes means for continuously supplying film for the articles to the path of movement of the articles. This film is in the form of a continuous web 24 of sheet material of the transparent plastic type would on a reel or roll 26. At the packaging station 14, the web 24 of sheet material is transformed from a flat configuration to a tubular configuration by suitable mechanism 28, such as shaper elements of the type disclosed in our copending application Ser. No. 615,121, filed Feb. 10, 1967 now U.S. Pat. No. 3,542,570. The flat web 24 of material is formed into the tubular or cylindrical configuration along the path of movement of the articles, and the articles are physically transferred into the tube. Thereafter, the longitudinal overlapping edges of the web are suitably interconnected, as by heat sealing mechanism 30, and the articles and film tube continue to move as a unit along a predetermined path.

At a subsequent station, the film is interconnected transversely between adjacent articles, as by a suitable sealing mechanism in the form of a pair of power driven rolls 32 driven by a motor and syncronizing mechanism 35 and 34 having circumferentially spaced lugs 36 and 38, respectively. The lugs 36 and 38 are appropriately spaced on the power driven rollers 32 and 34 so as to come into engagement with opposed surfaces of the film to seal the facing surfaces together to form individual article containing packets. Preferably, the lugs 38 also include cutting means 40 for automatically severing the packets along the transverse seal to produce individually packaged articles 42 that are received on an exit conveyor 44 and transferred to an area for further processing.

According to the present invention, the articles 12 are weighed at the weighing station 20 prior to being received in the packaging means 24. For this purpose, the weighing station 20 incorporates weighing means 50 for determining the total weight of each of the articles 12 as they are moving along a path. The weighing means may be in the form of a short conveyor section 52 interposed between the conveyors 16 and 18 and mounted in such a manner that the lugs 22 on the conveyor 18 will force the articles 12 onto the short belt section 52. As each article 12 is being moved from the entrance to the exit end of the belt 52, the total or tare weight is determined by the weighing mechanism 54 and is supplied to a computer 56 through a weight readout means 58. The computer 56 is of conventional design and determines the total price of the respective articles based on the total weight received from the weighing means 50 as well as the selected price per unit of weight supplied to the computer from the mechanism or selector 60.

The total price, price per unit of weight and total weight information of the articles are supplied to printing means or mechanism 62 which is disposed adjacent the path of the continuous supply of film 24. Printing mechanism 62 is adapted to impress the various figures upon corresponding labels from label supply 70. Again, for purposes of illustration, this is accomplished by a suitable switch 64 located adjacent the conveyor 52 and actuated by lugs 66 on the conveyor 52. The lugs 66 may be arranged in a manner that they will be disposed in the path of the switch arm and actuate the switch arm after an article leaves the weighing conveyor 52 and prior to a subsequent article 12 being received on the conveyor. Alternatively, the printing mechanism could be actuated by a photocell unit at the weighing station that would generate an appropriate signal for energizing the printing mechanism in response to the presence of an article at the weighing station. The power driven roller 32 draws the film from the roll 26 at a rate corresponding with the speed of movement of the articles 12 while the film or material 24 is intermittently supplied with labels by the printing mechanism 62.

Thus, it will be appreciated that the present packaging method is capable of automatically weighing the articles as they are moved along a path; computing a total price for each article based upon the price per unit of weight for the article; printing a label for each article with the total price, as well as the tare or total weight, and the unit price; attaching the label to a package for the article; and subsequently packaging the article with its associated label so that a completed package is produced which has the appropriate value thereon.

While the weighing mechanism has been disclosed as being of the conveyor type, it is readily apparent that various other types of commercially available weighing mechanisms may be used. For example, a mechanism of the type disclosed in Arvidson et al. U.S. Pat. No. 3,342,661, wherein the articles are moved across a scale by pusher members disposed above the platform for the scale. The computer and printing mechanism may be of the type disclosed in U.S. Pat. No. 3,329,807, with minor modifications. Alternatively, the apparatus, with some modifications, disclosed in U.S. Pat. No. 3,194,710 may be utilized as the computing and labeling mechanism. The above patents are incorporated herein by reference to the extent they are not inconsistent with the present disclosure.

What is claimed is:

1. A method for automatically weighing, labeling and packaging a plurality of random weight articles moving along a main flow path comprising the steps of weighing said articles as they are moved along said path; supplying the weight to a computer and computing a total price for each article based upon a price per unit of weight for said articles; supplying the total price to a printing mechanism and printing a label for each article with said total price; attaching said labels to one surface of a package forming material for said articles; moving said material with said labels attached to said path at a rate corresponding to the speed of movement of said articles; enclosing successive articles with said material in such matter that each label is positioned between said surface and said article to produce a packaged article having its corresponding total price thereon.

2. A method as defined in claim 1, in which said material is in the form of a continuous thin film-like web and said labels are attached to a surface of said web; the further improvement of transforming said web into a tube along said main flow path and in surrounding relation to said articles moving along said path; and sealing said tube to completely enclose individual articles.

3. A method of weighing, labeling and packaging food products and the like which comprises the steps of advancing individual quantities of random weight food products and the like in spaced relation to each other along a path; weighing each quantity as it is moved along said path; supplying the weight to a computer and computing a total price for each quantity based on a price per unit of weight; advancing package forming material toward said path; transferring the total price to a printing mechanism; transferring the total price from the printing mechanism onto the advancing material; delivering said material to said path with each printing synchronized with the corresponding individual quantity; and enclosing the individual quantities of food products and the like with said material and with said printing being located between the material and the food products and the like.

4. A method as defined in claim 3, including the further steps of supplying unit price and tare weight information for each quantity to said printing mechanism; transferring the total price, unit price and tare weight onto the material by printing such information on labels at spaced sections of the material corresponding with each package; and attaching the labels to a surface of said material.

5. A method as defined in claim 3, in which the total price is transferred directly from the printing mechanism to one surface of said material.

6. A method as defined in claim 3, including the further step of delivering labels to said printing mechanism for receiving said printing and attaching said labels to said material.

7. A system for automatically packaging and labeling random weight articles comprising: conveying means for moving articles in spaced relation along a path; and first means for continuously supplying packaging material for said articles to said path; the improvement of weighing means disposed in said path for determining the weight of each article; computing means cooperating with said weighing means and producing a total price for each article based upon said weight and a price per unit of weight; printing means receiving said weights and said total prices, said printing means cooperating with said first means for impressing successive areas of said packaging material with weights and total prices for successive articles, said first means including means for delivering said material to said path with the impressions synchronized with the associated article; and mechanism for enclosing successive articles with areas of said material having the associated weight impressed thereon.

8. A system as defined in claim 7, further including means supplying labels for said impressions, said labels having means for attaching to said material.

9. A system as defined in claim 7, in which said impressions are transferred directly onto one surface of said material.

* * * * *

UNITED STATES PATENT OFFICE
CERTIFICATE OF CORRECTION

Patent No. 3,650,773     Dated March 21, 1972

Inventor(s) ROBERT G. BUSH and GILBERT H. HANNON

It is certified that error appears in the above-identified patent and that said Letters Patent are hereby corrected as shown below:

Column 2, line 19, after "unit" add -- of --.

Column 2, line 75, "would" should read -- wound --.

Column 3, line 16, after "32" add -- and 34 --.

Column 3, line 17, delete "and 34".

Column 4, line 27, "matter" should read -- manner --.

Signed and sealed this 11th day of July 1972.

(SEAL)
Attest:

EDWARD M. FLETCHER, JR.
Attesting Officer

ROBERT GOTTSCHALK
Commissioner of Patents